No. 797,855. PATENTED AUG. 22, 1905.
H. INMAN.
CAR DUMP.
APPLICATION FILED DEC. 20, 1901.
2 SHEETS—SHEET 1.
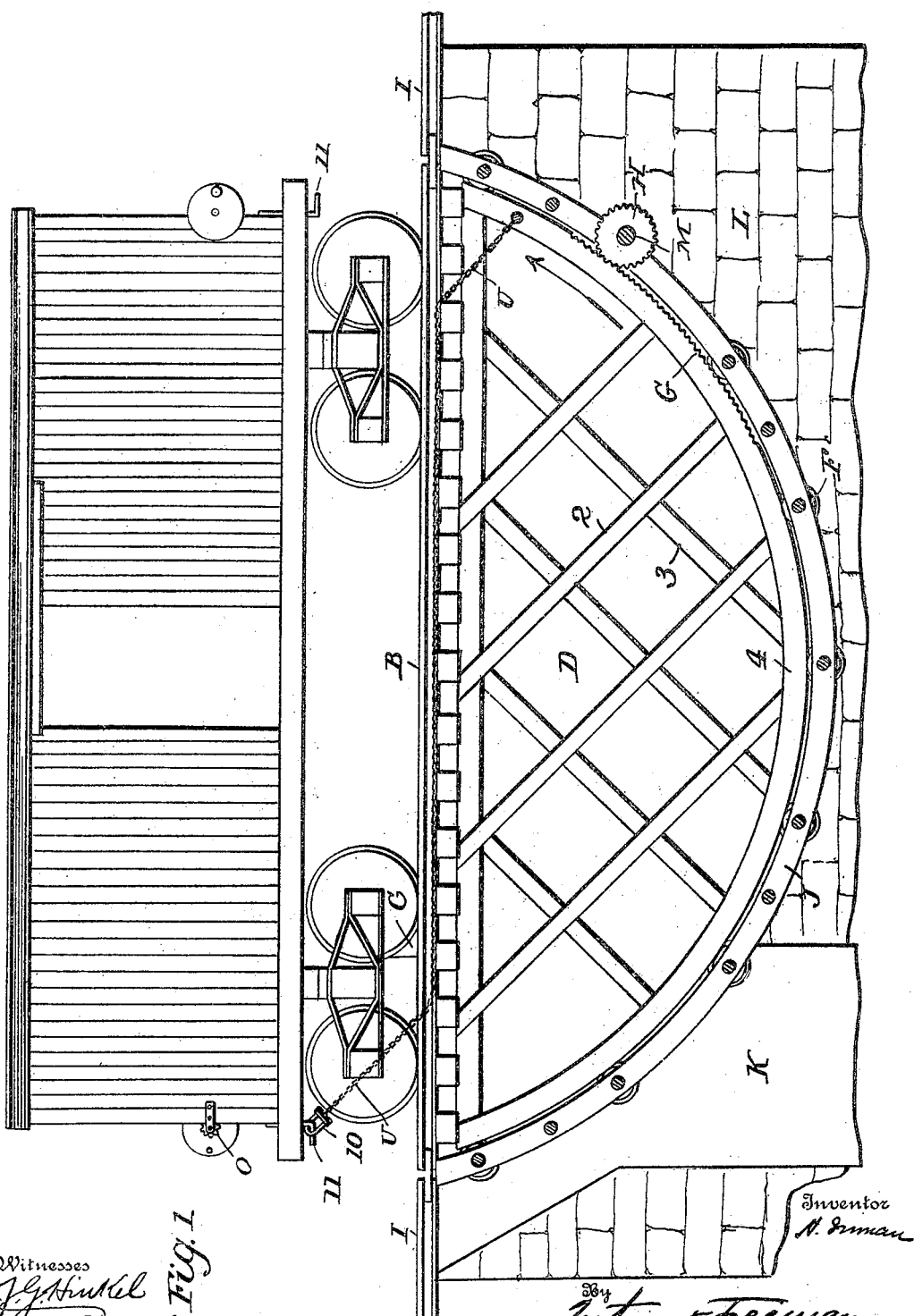

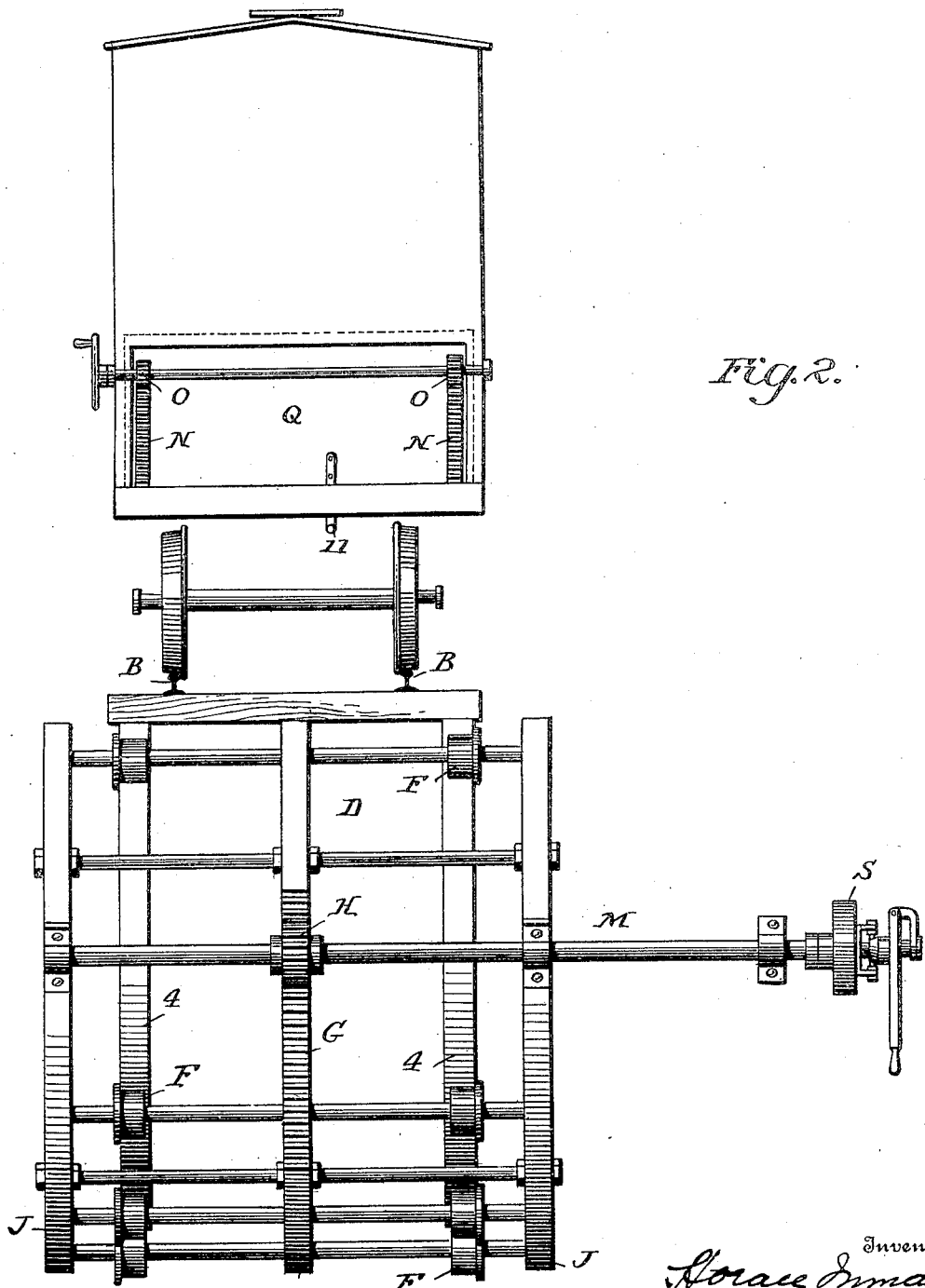

UNITED STATES PATENT OFFICE.

HORACE INMAN, OF AMSTERDAM, NEW YORK.

CAR-DUMP.

No. 797,855. Specification of Letters Patent. Patented Aug. 22, 1905.

Application filed December 20, 1901. Serial No. 86,685.

*To all whom it may concern:*

Be it known that I, HORACE INMAN, a citizen of the United States, residing at Amsterdam, in the county of Montgomery and State of New York, have invented certain new and useful Improvements in Car-Dumps, of which the following is a specification.

My invention relates to car-dumps, and has for its object to provide a simple, cheap, and effective dump whereby cars and other vehicles may be tilted or rocked longitudinally so as to deliver or dump the load at the end of the car and one that will require relatively little power to operate; and to these ends my invention consists in a car-dump embodying the general features of construction and arrangement of parts and having the general mode of operation substantially as hereinafter more particularly set forth.

Referring to the drawings, wherein I have illustrated a preferred embodiment of my invention, Figure 1 is a sectional elevation of the car-dump with a car resting thereon, and Fig. 2 is an end view illustrating the supporting-bearings and adjusting devices.

In carrying out my invention I provide a dump whereby a car or other vehicle may be tilted or rocked substantially in its longitudinal plane, so that one end of the car or vehicle will be depressed while the other end is correspondingly raised and the material can be delivered from the depressed end of the car into a proper receptacle. It is obvious that in such a construction the minimum amount of power is necessary in order to operate the dump, as the load is practically balanced and the car or vehicle is simply to be tilted without being bodily raised, and the floor of the car or vehicle may be inclined to the proper degree to allow the load to be delivered.

I form in the way or roadway a depression below the surface thereof and mount in this depression a suitable rocking support adapted to receive the car and to be tilted or rocked so as to depress one end of the car to deliver the material. Thus I have shown a substructure L, which may be of masonry or other suitable material and which, as shown, is provided at one end with the chute K to receive the material from the car, and this structure is arranged below the surface of the road-bed, which in the present instance is shown as provided with rails I I.

Suitably mounted in the depression and on the substructure is a support D, which may be of any suitable construction and is shown as composed of cross-bars 2 3, supporting the platform or track B, which is on a line with the way and in the present instance is provided with rails to receive a car from the rails I. This support is adapted to be tilted or rocked and is provided with curved bars 4, which correspond to an arc of a circle and form the curved rail-bearings for the support D. The substructure L is also provided with similar curved rail-bearings J, and for the purpose of facilitating movement between the bearings 4 and J friction or bearing rollers F are provided, so that the support and platform carried thereby can be readily rocked or tilted in the manner set forth.

Some suitable means must be provided for rocking or tilting the support, and I have shown a curved rack-bar G, and engaging with this rack-bar is a pinion H, mounted on a shaft M, adapted to be driven by any suitable power, and in the present instance I have shown a band-wheel S, through which power may be transmitted to the shaft.

Preferably the support D is a truss of iron provided with the curved bars 4 and supporting the platform or track B, and it is constructed with the desired rigidity to support the car or other vehicle to be dumped, and while in the present instance I have shown the substructure L as provided with curved rails supporting the rollers F it is manifest that the rollers may be attached to the curved bars 4 of the support, constituting simply a reversal of these parts.

The car or other vehicle may be held in place upon the tilting platform and support in any suitable way—as, for instance, by the chuck-blocks C or by the use of the chain or chains connected to the support D and adapted to engage some portion of the car. In the present instance these chains are shown as provided with U-shaped hooks 10, which engage a projection 11 on the car-frame. The particular means of holding the car or other vehicle in position are immaterial so far as the main features of my invention are concerned.

The car or vehicle is preferably provided with end doors, and I have shown in the present instance doors Q, provided with racks N, with which engage pinions O, by means of which the door may be opened to discharge the contents of the car into the chute K when the door is in an inclined position; but it is manifest that other means of opening the door may be used in connection with the main features of my invention. In this instance the car is provided with doors at either end, so that whichever way it is placed upon the platform it can be tilted or rocked and discharge its contents.

The mode of operation of my device will be largely understood from the above, and it may be stated that when the car or other vehicle is placed upon the platform on the rocking or tilting support the latter is operated by suitable means, such as the pinion-and-rack gear, to cause the same to be rocked or tilted in the depression or on the substructure. In doing this one end of the car is depressed while the other is raised, and it is manifest that but a relatively small amount of power is required to thus operate the dump. When one end of the car has been properly depressed, the door is opened in any suitable way, and the contents of the car are delivered into the chute K and the platform and support restored to their normal position.

It will be obvious that this device may, if desired, be used for dumping ordinary wagons adapted to be drawn by horses, and in such instance the rails may be omitted from the platform or support D, which will be covered with a suitable floor, so that the wagon or other vehicle may be readily moved into position to be dumped.

It will thus be seen that I provide a simple, cheap, and effective construction which may be applied for various purposes in various connections and in which the support is depressed below the level of the track or way, so as to readily receive the car or other vehicle, and then the support is rocked or tilted so as to tilt the car or vehicle longitudinally and in the longitudinal plane of the track or way, depressing one end and raising the other to the desired degree, so that the material contained in the car or vehicle will be delivered from one end into the chute or receptacle for the material. It will also be seen that the substructure is solid and extends the full length of the tilting platform and is provided with a chute at one end and that the platform is provided with a curved support also extending the full length of the platform, and both the tilting platform and substructure are provided with correspondingly-curved bars forming extended bearing-surfaces, one of which is provided with friction devices, and by this means the tilting platform is supported practically throughout its extent and can be easily moved to dump the material into the chute.

What I claim is—

1. The combination with a track or way, of a depressed substructure provided with a chute at one end, and a rocking platform and support therefor, the support and substructure being provided with curved bearings extending throughout their length, substantially as described.

2. The combination with a track or way, of a depressed substructure having a chute at one end and provided with curved bearings throughout its length, a support mounted on the substructure and having curved bearings extending throughout its length, friction devices between the curved bearings, and means for moving the support with relation to the substructure, substantially as described.

3. The combination with a track or way, of a depressed substructure having a chute at one end, curved bearings extending throughout the substructure, a tilting platform, a support therefor provided with curved bearings corresponding to the curved bearings in the substructure, friction devices between the bearings, and means for operating the platform whereby the platform is given a long swing requiring little power, substantially as described.

4. The combination with a track or way, of a depressed substructure provided with a chute at one end, a rocking platform and support therefor, the support and substructure being provided with curved bearings extending throughout their length, means for securing a car upon the platform, and means for delivering the load from the end of the car when it is tilted, substantially as described.

5. The combination with a track or way, of a depressed substructure having a curved surface below the way and having a chute at one end, a tilting platform, a support for the platform extending throughout its length and fitting the depressed substructure, and means for moving the tilting platform whereby the platform is sustained throughout its length and an extended bearing-surface is furnished between the support and substructure.

In testimony whereof I have signed my name to this specification in the presence of two subscribing witnesses.

HORACE INMAN.

Witnesses:
H. B. WALDRON,
CHAS. W. CLARK.